(12) United States Patent
Faradjev et al.

(10) Patent No.: US 11,182,831 B1
(45) Date of Patent: Nov. 23, 2021

(54) METHODS AND SYSTEMS FOR UNTARGETING USERS OF AN ONLINE SERVICE FOR ADVERTISING

(71) Applicant: FACEBOOK, INC., Menlo Park, CA (US)

(72) Inventors: Dmitry Faradjev, Mountain View, CA (US); Aswin Prakash Natesan Sridaran, San Francisco, CA (US); Aniruddha Ramakant Kortikar, Sunnyvale, CA (US); Po Lung Chen, San Jose, CA (US)

(73) Assignee: FACEBOOK, INC., Menlo Park, CA (US)

( * ) Notice: Subject to any disclaimer, the term of this patent is extended or adjusted under 35 U.S.C. 154(b) by 1154 days.

(21) Appl. No.: 15/377,921

(22) Filed: Dec. 13, 2016

Related U.S. Application Data

(60) Provisional application No. 62/415,415, filed on Oct. 31, 2016.

(51) Int. Cl.
*G06Q 30/02* (2012.01)
*H04L 29/08* (2006.01)
*H04L 29/06* (2006.01)

(52) U.S. Cl.
CPC ......... *G06Q 30/0277* (2013.01); *H04L 67/02* (2013.01); *H04L 67/146* (2013.01); *H04L 67/42* (2013.01)

(58) Field of Classification Search
None
See application file for complete search history.

(56) References Cited

U.S. PATENT DOCUMENTS

| 2011/0231240 A1* | 9/2011 | Schoen | G06Q 30/0242 |
| | | | 705/14.41 |
| 2011/0231305 A1* | 9/2011 | Winters | G06Q 20/10 |
| | | | 705/39 |

OTHER PUBLICATIONS

Martin et al., "Hidden surveillance by Websites: Web bugs in contemporary use," Commun. ACM 46, 12 (Dec. 2003), pp. 258-264. (Year: 2003).*

* cited by examiner

*Primary Examiner* — Christopher B Tokarczyk
(74) *Attorney, Agent, or Firm* — Morgan, Lewis & Bockius LLP (57) ABSTRACT

A method to untarget users of an online service for advertising includes embedding first code corresponding to a first pixel and second code corresponding to a second pixel in a version of a webpage and providing the version of the webpage for loading by a client device. Loading of the version of the webpage by the client device triggers execution of the first code and the second code by the client device. Furthermore, execution of the first code by the client device signals an advertising platform to forgo providing one or more advertisements for a service associated with the server system to the client device. Additionally, execution of the second code by the client device provides a signal to the server system.

20 Claims, 5 Drawing Sheets

METHODS AND SYSTEMS FOR UNTARGETING USERS OF AN ONLINE SERVICE FOR ADVERTISING

RELATED APPLICATIONS

This application claims priority to U.S. Provisional Patent Application No. 62/415,415, filed Oct. 31, 2016, which is incorporated by reference in its entirety.

TECHNICAL FIELD

This relates generally to online service advertising, including but not limited to untargeting users of an online service for advertising.

BACKGROUND

Advertisements are generally displayed and received by viewers and/or users of a platform's product. A problem may arise when the viewers and/or users of the platform's product fall into multiple groups (e.g., existing/active users of the product versus prospective users of the product). It may be desirable not to provide advertisements to certain groups, while providing advertisements to other groups. For example, providing advertising to active users may be an ineffective use of advertising. Identifying the viewers and/or users that fall into each specific group, however, is expensive and inefficient, and subject to both human and machine-based inaccuracies.

SUMMARY

Accordingly, there is a need for methods and systems for untargeting users of an online service for advertising. Embedding additional pieces of code within a webpage (e.g., a homepage associated with a service provided by the platform) provided to a client device can improve untargeting users of an online service for advertising. Such methods and systems allow users who are not to receive advertising to be identified efficiently and accurately.

In accordance with some embodiments, a method is performed at a server system having processors and memory storing instructions for execution by the processors. The method includes embedding a first code corresponding to a first pixel in a version of a webpage, embedding a second code corresponding to a second pixel in the version of the webpage, and providing the version of the webpage for loading by a client device in response to a request from the client device for the webpage. Loading the version of the webpage by the client device triggers execution of the first code and the second code by the client device. Execution of the first code by the client device signals an advertising platform to forgo providing one or more advertisements for a service associated with the server system to the client device. Execution of the second code by the client device provides a signal to the server system.

In accordance with some embodiments, a method is performed at a client device having processors and memory storing instructions for execution by the processors. The method includes requesting a webpage from a server system in response to detecting a user request for the webpage and receiving a version of the webpage from the server system. The version of the webpage includes first code corresponding to a first pixel embedded in the version of the webpage and second code corresponding to a second pixel embedded in the version of the webpage. In response to receiving the version of the webpage from the server system, the client device executes the first code and the second code. Executing the first code includes signaling an advertising platform to forgo providing one or more advertisements for a service associated with the server system to the client device. Executing the second code includes signaling the server system.

In accordance with some embodiments, a server system includes one or more processors/cores, memory, and one or more programs; the one or more programs are stored in the memory and configured to be executed by the one or more processors/cores and the one or more programs include instructions for performing the operations of the server-side method described above. In accordance with some embodiments, a non-transitory computer-readable storage medium has stored therein instructions which, when executed by one or more processors/cores of a server system, cause the server system to perform the operations of the server-side method described above.

In accordance with some embodiments, a client device includes one or more processors/cores, memory, and one or more programs; the one or more programs are stored in the memory and configured to be executed by the one or more processors/cores and the one or more programs include instructions for performing the operations of the client-side method described above. In accordance with some embodiments, a non-transitory computer-readable storage medium has stored therein instructions which when executed by one or more processors/cores of a client device, cause the client device to perform the operations of the client-side method described above.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, first code could be termed second code, and, similarly, second code could be termed first code, without departing from the scope of the various described embodiments. The first code and the second code are both code, but they are not the same code.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
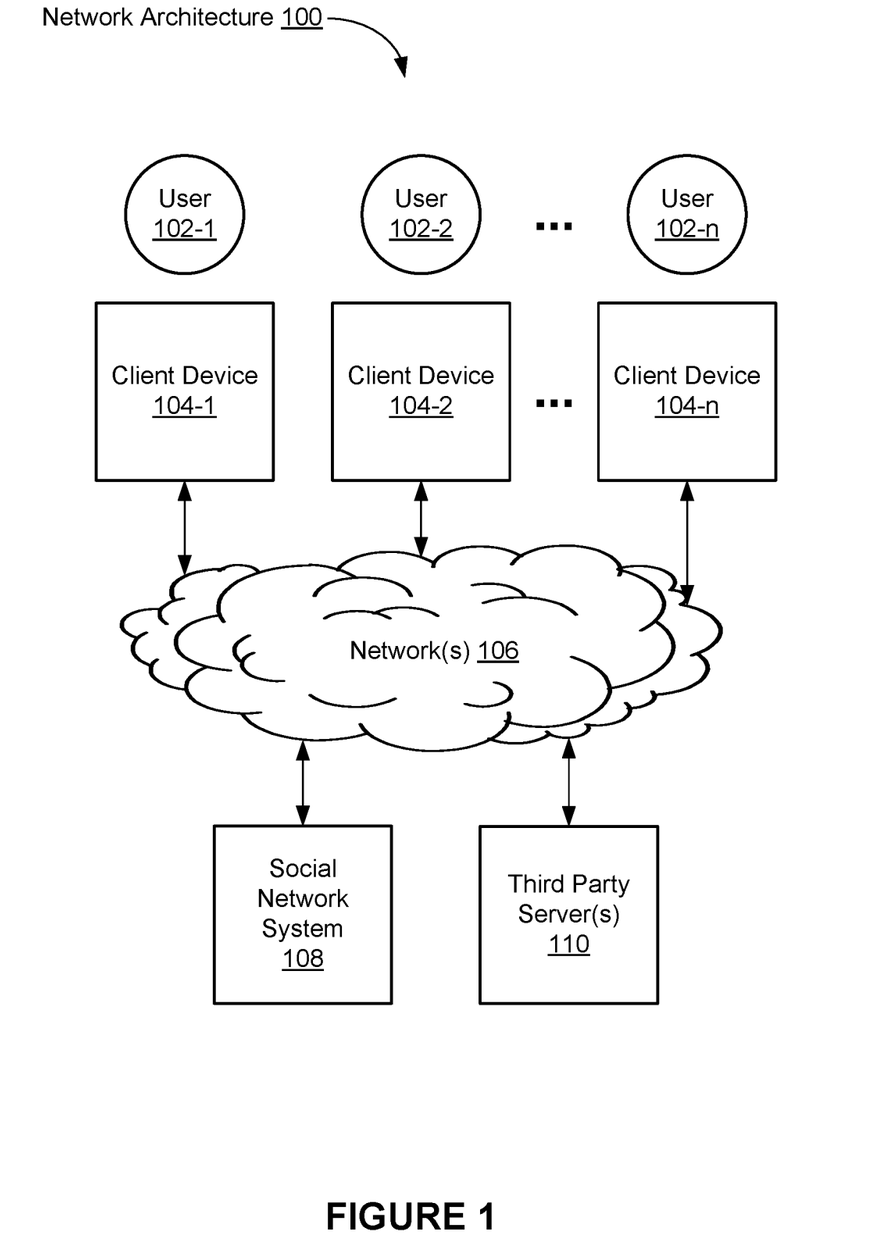
FIG. 1 is a block diagram illustrating an exemplary network architecture of a social network in accordance with some embodiments.

FIG. 1 is a block diagram illustrating an exemplary network architecture of a social network in accordance with some embodiments. The network architecture 100 includes a number of client devices (also called "client systems," "client computers," or "clients") 104-1, 104-2, . . . 104-n communicably connected to a social network system 108 by one or more networks 106.

In some embodiments, the client devices 104-1, 104-2, . . . 104-n are computing devices such as smart watches, personal digital assistants, portable media players, smart phones, tablet computers, 2D gaming devices, 3D gaming devices, virtual reality devices, laptop computers, desktop computers, televisions with one or more processors embedded therein or coupled thereto, in-vehicle information systems (e.g., an in-car computer system that provides navigation, entertainment, and/or other information), or other appropriate computing devices that can be used to communicate with an electronic social network system and other computing devices (e.g., via the electronic social network system). In some embodiments, the social network system 108 is a single computing device such as a computer server, while in other embodiments, the social network system 108 is implemented by multiple computing devices working together to perform the actions of a server system (e.g., cloud computing). In some embodiments, the network 106 is a public communication network (e.g., the Internet or a cellular data network), a private communications network (e.g., private LAN or leased lines), or a combination of such communication networks.

Users 102-1, 102-2, . . . 102-n employ the client devices 104-1, 104-2, . . . 104-n to access the social network system 108 and to participate in a social networking service. For example, one or more of the client devices 104-1, 104-2, . . . 104-n execute web browser applications that can be used to access the social networking service. As another example, one or more of the client devices 104-1, 104-2, . . . 104-n execute software applications that are specific to the one or more social networks (e.g., social networking "apps" running on smart phones or tablets, such as a Facebook social networking application, a messaging application, etc., running on an iPhone, Android, or Windows smart phone or tablet).

Users interacting with the client devices 104-1, 104-2, . . . 104-n can participate in the social networking service provided by the social network system 108 by providing and/or consuming (e.g., posting, writing, viewing, publishing, broadcasting, promoting, recommending, sharing) information, such as text comments (e.g., statuses, updates, announcements, replies, location "check-ins," private/group messages), digital content (e.g., photos, videos, audio files, links, documents), and/or other electronic content. In some embodiments, users provide information to a page, group, message board, feed, and/or user profile of a social networking service provided by the social network system 108. Users of the social networking service can also annotate information posted by other users of the social networking service (e.g., endorsing or "liking" a posting of another user, or commenting on a posting by another user). In some embodiments, information can be posted on a user's behalf by systems and/or services external to the social network or the social network system 108. For example, the user may post a review of a movie to a movie review website, and with proper permissions that website may cross-post the review to the social network on the user's behalf. In another example, a software application executing on a mobile client device, with proper permissions, may use a global navigation satellite system (GNSS) (e.g., global positioning system (GPS), GLONASS, etc.) or other geo-location capabilities (e.g., Wi-Fi or hybrid positioning systems) to determine the user's location and update the social network with the user's location (e.g., "At Home," "At Work," or "In San Francisco, Calif."), and/or update the social network with information derived from and/or based on the user's location. Users interacting with the client devices 104-1, 104-2, . . . 104-n can also use the social network provided by the social network system 108 to define groups of users. Users interacting with the client devices 104-1, 104-2, . . . 104-n can also use the social network provided by the social network system 108 to communicate (e.g., using a messaging application or built-in feature) and collaborate with each other.

In some embodiments, the network architecture 100 also includes third-party servers (e.g., third party server 110). In some embodiments, third-party servers 110 are associated with third-party service providers who provide services and/or features to users of a network (e.g., users of the social network system 108, FIG. 1). For example, in some embodiments, a third-party server 110 may provide one or more advertisements and/or one or more advertising campaigns to client devices that participate in the social networking service provided by the social network system 108. A third-party server 110 thus may act as an advertising platform. In another example, a given third-party server 110 is used to host third-party websites that provide web pages to client devices 104, either directly or in conjunction with the social network system 108. In some embodiments, a given third-party server 110 is used to host third-party applications that are used by client devices 104, either directly or in conjunction with the social network system 108.

In some embodiments, users may access third-party services or servers by loading pages (also referred to herein as webpages) associated with third-party service providers within an application (e.g., a web browser application) for a service provider distinct from the third-party service providers (e.g., by selecting links provided within social network client module 340 to access pages of a third-party service). Pages may include script (also referred to herein as additional source code or simply code) for calling one or more application programming interfaces (APIs) of a server system (e.g., one or more APIs of the social network system 108 or a third-party server 110, FIG. 1) to obtain and/or provide user information (e.g., location information, payment credentials, profile information, client device information, etc. collected and stored in connection with using the social networking service). The script may be executed at some time during a user's interaction with the loaded page (e.g., when the page is loaded, in response to a detected interaction within a loaded page, etc.).

Figure 4:
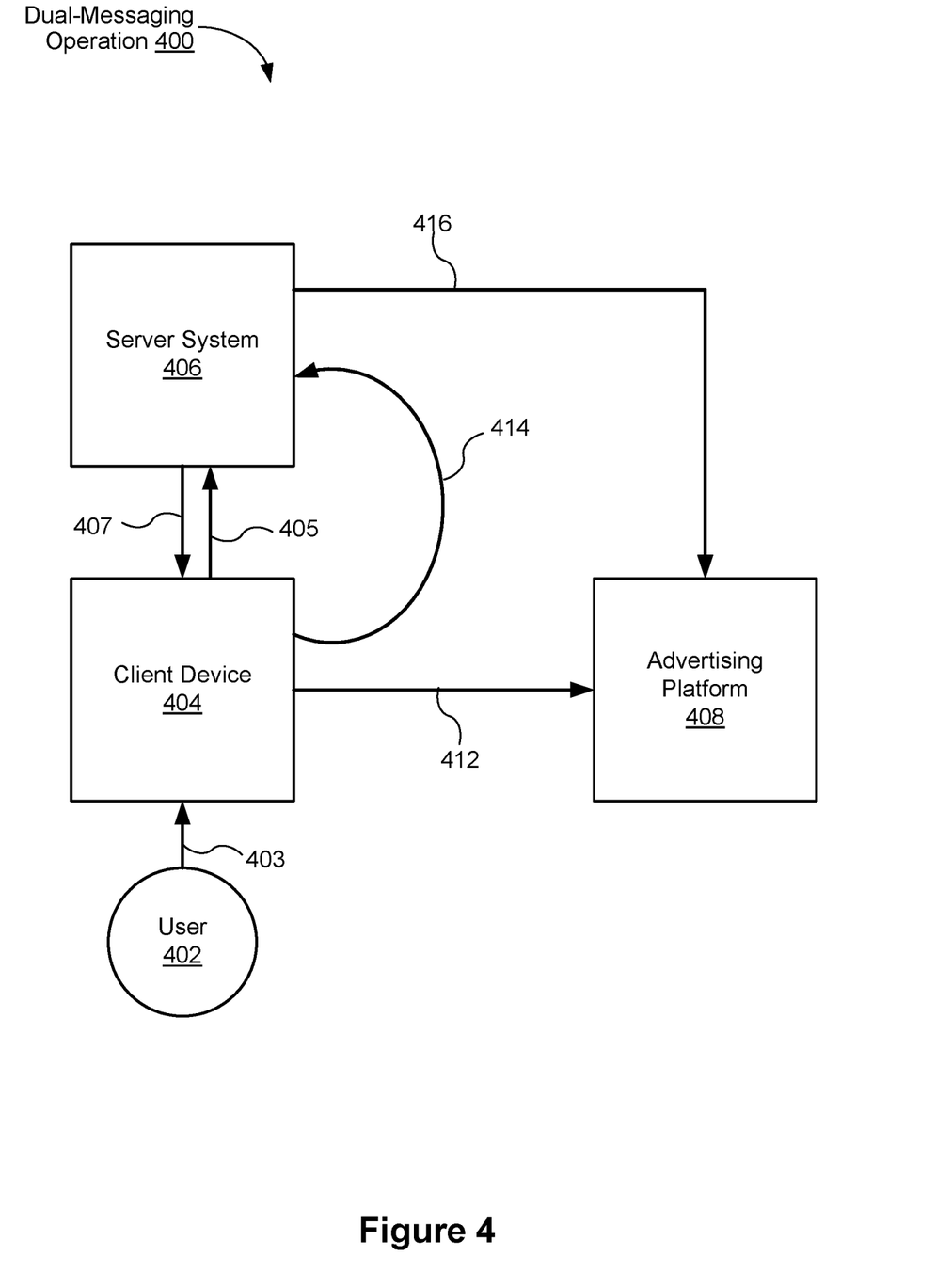
FIG. 4 is a flow diagram illustrating a method of untargeting users for advertising, in accordance with some embodiments.

In some embodiments, a given third-party server 110 is used to provide third-party content to client devices (e.g., news articles, advertisements, message feeds, etc.). In some embodiments, a given third-party server 110 is a single computing device (e.g., server computer), while in other embodiments, a given third-party server 110 is implemented by multiple computing devices working together to perform the actions of a server system (e.g., cloud computing). In some embodiments, the third-party server 110 is an example of an advertising platform 408 (FIG. 4).

Figure 2:
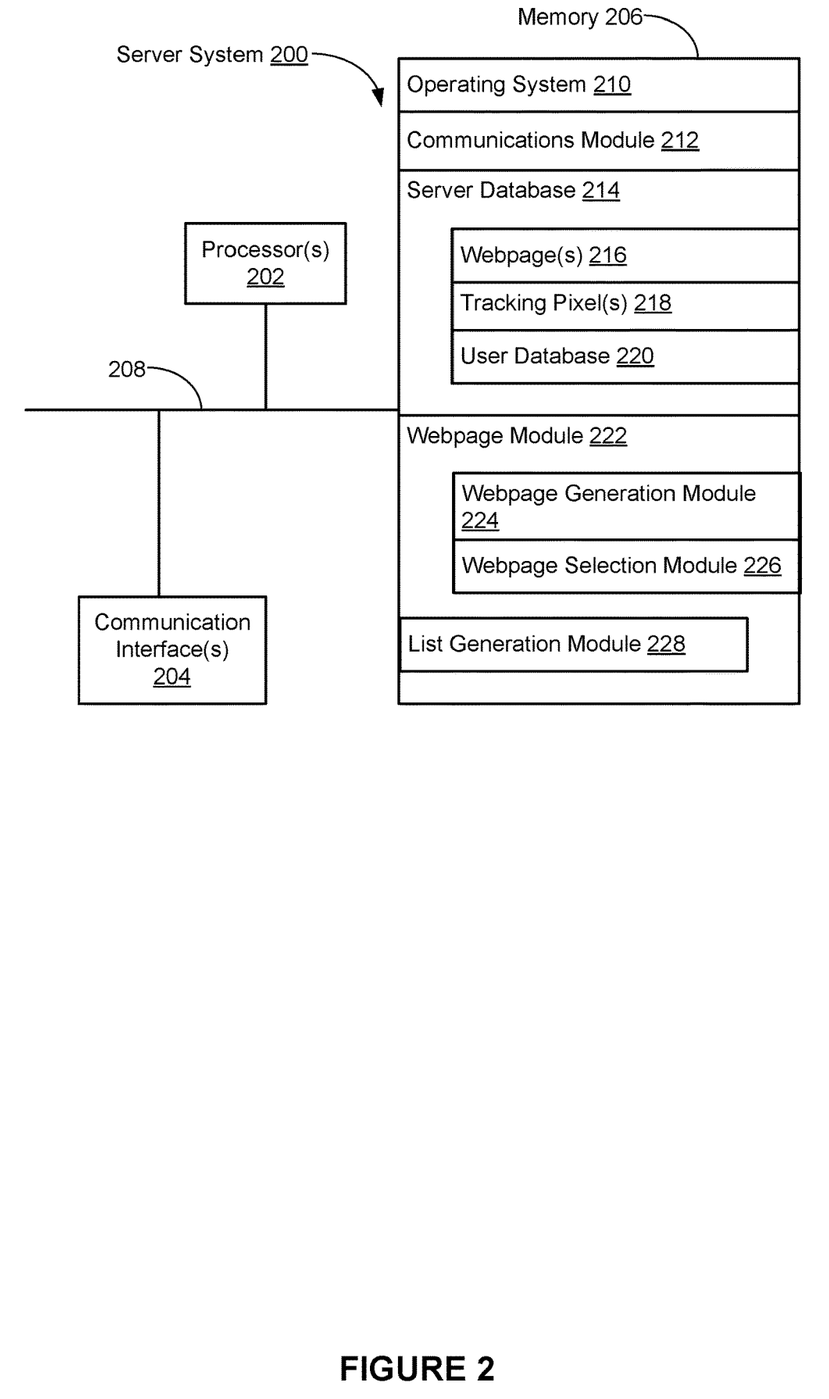
FIG. 2 is a block diagram illustrating an exemplary server system in accordance with some embodiments.

FIG. 2 is a block diagram illustrating an exemplary server system 200 in accordance with some embodiments. In some embodiments, the server system 200 is an example of the social network system 108 (FIG. 1). The server system 200 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The server system 200 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display may be a touch-sensitive display.

Memory 206 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the processor(s) 202. Memory 206, or alternately the non-volatile memory device(s) within memory 206, includes a non-transitory computer readable storage medium. In some embodiments, memory 206 or the computer readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting server system 200 (e.g., social network system 108, FIG. 1) to other computers (e.g., client devices 104-1, 104-2, . . . 104-n, and/or third-party server 110, FIG. 1) via the one or more communication network interfaces 204 (wired or wireless) and one or more communication networks, such as the Internet, cellular telephone networks, mobile data networks, other wide area networks, local area networks, metropolitan area networks, and so on;
- a server database 214 for storing data associated with the server system 200, such as:
    webpages 216 (including one or more versions of one or more webpages);
    tracking pixels 218 (e.g., a segment of code (e.g., HTML) that, when executed, requests information from and provides information to a source server); and
    user database 220;
- a webpage module 222 for managing one or more webpages of the server system 200, the webpage module 222 includes:
    webpage generation module 224 for embedding code in webpages and generating webpages, including different versions of respective webpages (e.g., a first version, a second version, and so on); and
    webpage selection module 226 for selecting versions of a respective webpage and for providing the version of the webpage to a requestor (e.g., a requesting client device 104); and
- a list generation module 228 for adding one or more client devices 104 to a respective list and providing lists to relevant third parties (e.g., an advertising platform).

In some embodiments, the webpage module 222 (e.g., the webpage selection module 226) includes a timer module used for tracking when to provide a first version of the webpage versus a second version of the webpage. In some embodiments, the timer module may be triggered by a request for a webpage.

The server database 214 stores data associated with the server system 200 in one or more types of databases, such as graph, dimensional, flat, hierarchical, network, object-oriented, relational, and/or XML databases.

In some embodiments, the server system 200 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Python, XHP, Javelin, Wireless Universal Resource File (WURFL), and the like.

Figure 3:
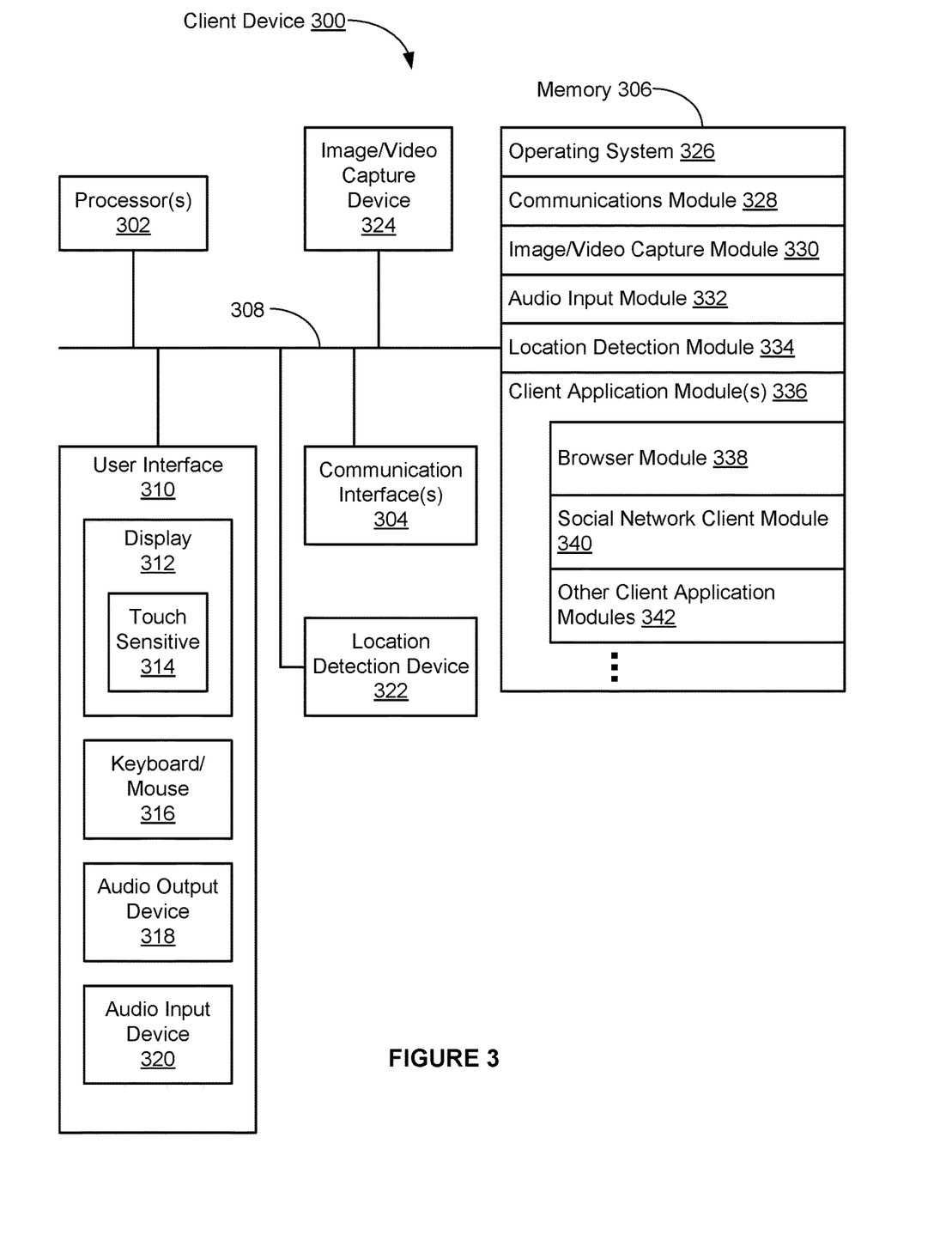
FIG. 3 is a block diagram illustrating an exemplary client device, in accordance with some embodiments.

FIG. 3 is a block diagram illustrating an exemplary client device 300, in accordance with some embodiments. The client device 300 is an example of the one or more client devices 104-1, 104-2, . . . 104-n (FIG. 1). The client device 300 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 300 includes a user interface 310. The user interface 310 typically includes a display device 312. In some embodiments, the client device 300 includes inputs such as a keyboard, mouse, and/or other input buttons 316. Alternatively or in addition, in some embodiments, the display device 312 includes a touch-sensitive surface 314, in which case the display device 312 is a touch-sensitive display. In some embodiments, the touch-sensitive surface 314 is configured to detect various swipe gestures (e.g., continuous gestures in vertical and/or horizontal directions) and/or other gestures (e.g., single/double tap). In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 300 use a microphone and voice recognition to supplement or replace the keyboard. Optionally, the client device 300 includes an audio input device 320 (e.g., a microphone) to capture audio (e.g., speech from a user). Optionally, the client device 300 includes a location detection device 322, such as a GNSS (e.g., GPS, GLONASS, etc.) or other geo-location receiver, for determining the location of the client device 300. The client device 300 also optionally includes an image/video capture device 324, such as a camera or webcam.

In some embodiments, the client device 300 includes one or more optional sensors (e.g., gyroscope, accelerometer) for detecting a motion and/or change in orientation of the client device. In some embodiments, a detected motion and/or orientation of the client device 300 (e.g., the motion/change in orientation corresponding to a user input produced by a user of the client device) is used to manipulate an interface (or content within the interface) displayed on the client device 300. In some embodiments, the one or more optional sensors may include an optical projection sensor for projecting an interface displayed on the client device 300 in 3D (e.g., project 3D hologram). Moreover, a user may manipulate the interface displayed on the client device 300 by interacting with the projected holographic 3D display.

Memory 306 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules, and data structures, or a subset or superset thereof:

- an operating system 326 that includes procedures for handling various basic system services and for performing hardware dependent tasks;
- a network communication module 328 that is used for connecting the client device 300 to other computers via the one or more communication network interfaces 304 (wired or wireless) and one or more communication networks, such as the Internet, cellular telephone networks, mobile data networks, other wide area networks, local area networks, metropolitan area networks, and so on;
- an image/video capture module 330 (e.g., a camera module) for processing a respective image or video captured by the image/video capture device 324, where the respective image or video may be sent or streamed (e.g., by a client application module 336) to the server system 200;
- an audio input module 332 (e.g., a microphone module) for processing audio captured by the audio input device 320, where the respective audio may be sent or streamed (e.g., by a client application module 336) to the server system 200;
- a location detection module 334 (e.g., a GNSS, Wi-Fi, or hybrid positioning module) for determining the location of the client device 300 (e.g., using the location detection device 322) and providing this location information for use in various applications (e.g., social network client module 340); and
- one or more client application modules 336, including the following modules (or sets of instructions), or a subset or superset thereof:
  - a web browser module 338 (e.g., Internet Explorer or Edge by Microsoft, Firefox by Mozilla, Safari by Apple, or Chrome by Google) for accessing, viewing, and interacting with web sites;
  - a social network module 340 for providing an interface to a social networking service (e.g., a social networking service provided by social network system 108) and related features, and for loading (e.g., within the interface for the social network module 340) pages associated with third-party service providers (e.g., to conduct transactions with the third-party service providers); and/or
  - optional client application modules 342, such as applications for word processing, calendaring, mapping, weather, stocks, time keeping, virtual digital assistant, presenting, number crunching (spreadsheets), drawing, instant messaging, e mail, telephony, video conferencing, photo management, video management, a digital music player, a digital video player, 2D gaming, 3D gaming, virtual reality, electronic book reader, and/or workout support.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

FIG. 4 is a flow diagram illustrating a method of untargeting users for advertising in accordance with some embodiments. In particular, FIG. 4 depicts a dual-messaging operation 400. The dual-messaging operation 400 may be used, at least in part, to identify users (e.g., existing users) of a service associated with a server system (e.g., server system 200, FIG. 2). For example, the service may be a social networking service associated with social network system 108 (FIG. 1). Furthermore, in some embodiments, the dual-messaging operation 400 may cause the identified users of the service to become untargeted from an advertising campaign. For example, once a client device is identified as a user of the service, an advertising platform will forgo presenting one or more advertisements associated with an advertising campaign for the service to the client device. In some embodiments, identified users of the service may be given advertisements from an alternative advertising campaign. For example, the alternative advertising campaign may be a campaign with advertisements designed for users of the service (as opposed to an advertising campaign designed to attract prospective users). In some embodiments, identified users of the service (e.g., existing/active users) are not shown advertisements for the service.

The dual-messaging operation 400 may involve a user 402 of a client device 404, a server system 406, and an advertising platform 408 (e.g., a third-party server 110, FIG. 1). The client device 404 (e.g., client device 300, FIG. 3; client device 104, FIG. 1) may request 405 a webpage from the server system 406 (e.g., server system 200, FIG. 2; social network system 108, FIG. 1). The client device 404 may make the request 405 in response to an initial request 403 (i.e., a user input) made by the user 402 of the client device 404. In some embodiments, the server system 406 may receive identification information from the client device 404 during the request 405. For example, the client device 404, in making the request 405, may pass to the server system an Internet Protocol (IP) address, cookie identification number(s), user identification, and/or a browser identification number associated with the client device 404.

In some embodiments, the user 402 employs the client device 404 to access the service provided by the server system 406. For example, the user 402 may request 403, via a web browser application of the client device 404, for the client device 404 to access a webpage (also referred to herein as a page) for the service. To make the request, the user 402 may input a URL into the web browser application. In another example, the user 402 may request 403 the webpage of the service by selecting a link for the webpage (e.g., a hyperlink on an unrelated webpage) or by selecting a bookmark. In some embodiments, the user 402 may interact with the service provided by the server system 406 via a software application executing on the client device 404 (e.g., a social networking "app" running on the client device, a messaging application, and the like).

The server system 406 (e.g., server system 200, FIG. 2) manages one or more webpages for the service provided by the server system 406. In some embodiments, the server system 406 manages the one or more webpages of the service by sending (e.g., making available) source code (e.g., HTML and/or JavaScript source code) for a webpage in response to receiving a request (e.g., request 405) from a web browser application of the client device 404. Moreover, the server system 406 may create different versions of a given webpage by modifying the source code for the webpage. For example, a first version of the webpage may include additional source code in a portion of the webpage (e.g., additional code (e.g., HTML) for a homepage of the service) relative to a second version of the webpage (e.g., the second version contains standard source code for the homepage of the service). (The first version of the webpage may be considered a first webpage and the second version of the webpage may be considered a second webpage, distinct and separate from the first webpage. To the user 402 of the client device 404, the first webpage appears to be the same as the second webpage.)

In some embodiments, the additional source code of the first version of the webpage may include one or more tracking pixels. A tracking pixel (e.g., a page tag) may be used to track client device interaction(s) with a webpage and provide information regarding the interaction to a server (e.g., server system 406 and/or advertising platform 408).

The tracking pixel is said to "fire" (also referred to as being triggered) through user engagement of a webpage, via the client device 404, having the embedded tracking pixel (e.g., loading of homepage, log-in page, and/or shopping cart page by the web browser application). In some embodiments, the tracking pixel is an HTML image request from the server (e.g., server system 406 and/or advertising platform 408), and includes other identification information that may pass to the server. In some embodiments, the tracking pixel may be an HTML frame element (e.g., an iframe), and includes other identification information that may pass to the server. The other identification information that may pass to the server may include, for example, IP address, cookie identifier(s), user identifier, and/or browser identifier. These client device identifiers may be read by the server or may be determined by it. In some embodiments, the identification may be made based on data regarding the user stored in a user database (e.g., user database 220, FIG. 2).

In some embodiments, a first version of the webpage includes first code and second code placed (i.e., embedded) in the webpage (e.g., a first pixel and a second pixel). For example, the source code of the first version of the webpage may include one or more distinct pieces of source code (e.g., HTML) that are not included in a second version of the webpage, such that the second version of the webpage does not include the first and/or second code. In some embodiments, the first code and second code are sequentially placed in the source code of the webpage. For example, the second code may be placed directly after (or before) the first code in the source code of the webpage. In some embodiments, the first version of the webpage includes first code embedded in a first portion of the webpage and second code embedded in a second portion of webpage. For example, the first code may be embedded near the beginning of the source code and the second code may be embedded near the end of the source code for the first version of the webpage (or vice versa).

The first and/or second of code may not, in some embodiments, affect an overall appearance of the webpage to the user. Instead, when the web browser application (e.g., an HTML parser of the web browser application) renders a tracking pixel, the code (e.g., script) associated with the tracking pixel calls API(s) of a source server (e.g., the server system 200 and/or an advertising platform) to obtain information (e.g., a single pixel-by-single pixel image), and thereafter retrieves the information from the source server which then becomes part of the webpage. As such, the first code, when executed, results in a first pixel being added to a first portion of the webpage. Similarly, the second code, when executed, may result in a second pixel being added on a second portion of the webpage. In some embodiments, execution of the first code (or the second code) results in a group of pixels becoming part of the webpage.

Although the discussion above references HTML, one skilled in the art will appreciate that various mark-up languages may be used and are within the scope of the invention. Further, while the discussion above references tracking pixels, one skilled in the art will appreciate that other tracking techniques, such as cookies unrelated to tracking pixels and server-based cookieless tracking techniques, may be employed and are within the scope of the invention.

The server system 406, in response to receiving the request 405 from the client device, selects a version of the webpage to provide to the client device 404. In some situations or circumstances, the server system 406 may provide 407 a first version of the webpage to the client device 404. In this example, the first version of the webpage may include an additional piece of source code (also referred to as first code) in the source code of the webpage. In some embodiments, the first code may be associated with an advertising platform 408. The server system 406 embeds the first code in the webpage on behalf of the advertising platform 408. The first code, when executed (e.g., rendered) by the web browser application of the client device 404, results in the advertising platform being signaled 412 that a webpage containing the first code was executed. In some embodiments, the first code may be associated with the server system 406. In such as a case, the server system 406 receives a signal from the client device 404 when the web browser renders the first version of the webpage with the first code.

In some embodiments, the first version of the webpage may include another addition piece of source code (also referred to as second code). In some embodiments, the second code may be associated with the server system 406. The server system 406 embeds the second code in the webpage on its own behalf. The second code, when executed (e.g., rendered) by the web browser application, results in the server system 406 being signaled 414 that a webpage containing the second code was executed.

Accordingly, the first version of the webpage may include the first code and the second code. Execution of the first and second code by the web browser application running on the client device 404 results in the advertising platform 408 and server system 406 being signaled that their respective codes were executed by the client device 404. Through this signaling, the server system 406 and the advertising platform 408 may obtain identification information associated with the client device 404. For example, the server system 406 and the advertising platform 408 may obtain IP address(es), cookie identifier(s), user identifier, and/or browser identifier. Examples of signaling the advertising platform and the server system are provided below with reference to FIG. 5.

In some embodiments, the server system 406, in response to receiving the request 405 from the client device 404, may provide 407 a second version of the webpage to the client device 404. In some embodiments, the second version of the webpage may not include additional code (e.g., does not include the first code and/or the second code). For example, the second version of the webpage may include the standard source code for rendering a page (e.g., a home page) for the service. To the user 402 of the client device 404, the second version of the webpage appears to be the same as the first version of the webpage.

In some embodiments, the advertising platform 408 creates a list of client devices 404 that have executed the first code in the first version of the webpage (i.e., a list of existing users of the service provided by the server system 200). However, in some circumstances, the web browser application of the client device 404 may fail to execute the first and second code when loading the first version of the webpage (e.g., webpage fails to load). In such circumstances, the client device 404 may not signal the advertising platform 408 to forgo providing one or more advertisements for the service, as a result of the first code not executing. Furthermore, the client device 404 may not signal the server system 406 as a result of the second code not executing. Consequently, the client device 404 may continue to receive advertisements from the advertising platform 408 even though the client device 404 may be associated with an existing user of the service (e.g., the user 402 of client device 404 may be a registered member of a social network service).

To remedy this situation, the server system 406 may resend the first version of the webpage to the client device 404 so that client device 404 reloads the first version of the webpage and executes the first code (and the second code). Alternatively or in addition, the server system 406 may send 416 a signal to the advertising platform 408 with one or more identifiers of the client device 404. For example, the server system 406 may send an IP address, cookie identifier(s), user identifier, and/or a browser identifier received from the client device 404 during the request 405. In this way, the advertising platform 408 may forgo presenting one or more advertisements to the client device. The server system 406 may signal the advertising platform 408 through HTTP, email, custom transfer protocols, and the like. Although "lists" are referenced as being used to catalog client device(s) 404 at various stages of the dual-messaging operation 400, other cataloging techniques known in the art may be used.

Figure 5:
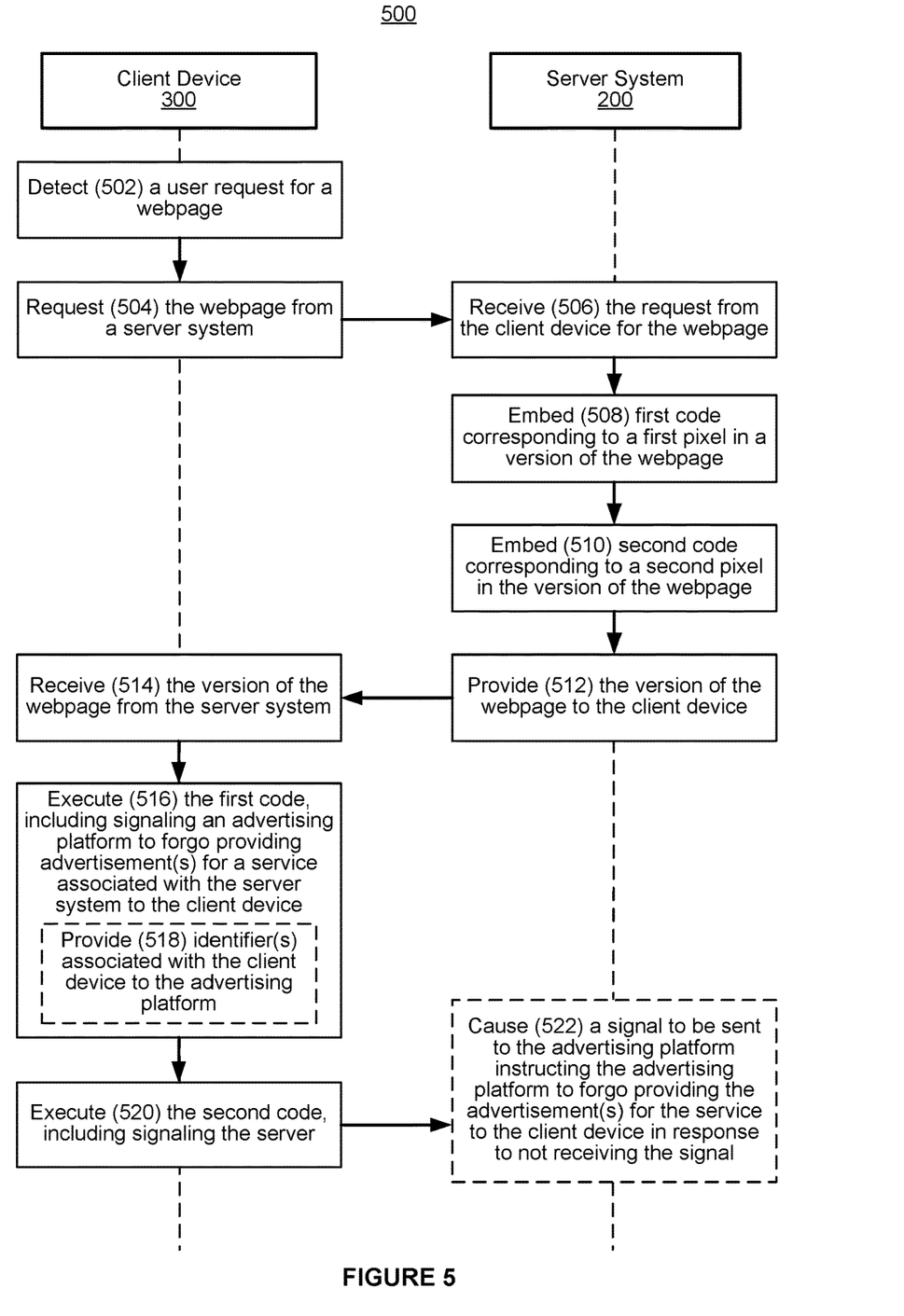
FIG. 5 is a flow diagram illustrating a method of untargeting users for advertising, in accordance with some embodiments.

FIG. 5 is a flow diagram illustrating a method of untargeting users for advertising in accordance with some embodiments. The steps of the method 500 may be performed by any combination of client device 300 (e.g., a client device 104, FIG. 1; client device 404, FIG. 4) and/or server system 200 (e.g., social network system 108, FIG. 1; server system 406, FIG. 4). FIG. 5 corresponds to instructions stored in computer memory (e.g., memory 306 of the client device 104, FIG. 3; memory 206 of the server system 200, FIG. 2) or another computer-readable storage medium. For example, the operations of method 500 may be performed, at least in part, by a communications module (e.g., communications module 212, FIG. 2), a webpage module (e.g., webpage module 222, FIG. 2), and a list generation module (e.g., list generation module 228, FIG. 2) in the server system, along with a communications module (e.g., communications module 328, FIG. 3) and a client application module (e.g., client application module 336, FIG. 3) in the client device.

In the method 500, a client device 300 detects (502) a user request for a webpage associated with a service provided by a server system 200. For example, the webpage associated with the service may be a homepage of the service. In another example, the webpage may be reserved for existing users of the service (e.g., for registered members of the service). In some embodiments, the user request may be detected in a web browser application executing on the client device 300 (e.g., Internet Explorer or Edge by Microsoft, Firefox by Mozilla, Safari by Apple, Chrome by Google, etc.). In some embodiments, the service provided by the server system 200 may be a social media platform and the webpage may be a home page of the social media platform.

In response to the user request, the client device 300 may request (504) the webpage from the server system 200. In some embodiments, in response to receiving the request from the client device 300 for the webpage, the server system 200 obtains and logs (e.g., stores) one or more client device identifiers for the client device 300. For example, the server system 200 may log client device identifiers for each client device 300 that requested the webpage from the server system 200 over a period of time (e.g., create a list). In some embodiments, one of the client device identifiers corresponds to a social media account associated with the client device 300. In some embodiments, the one or more client device identifiers may correspond to a web browser application identifier (e.g., one or more cookies embedded in the client device and/or an IP address associated with the client device 300). After expiration of the period of time, the server system 200 may, for example, send a copy of the list to an interested third party, such as the advertising platform 408 (FIG. 4).

After receiving (506) the request from the client device 300, the server system 200 may determine a version of the webpage to provide to the client device 300. For example, the server system 200 may select a version of the webpage, from a plurality of versions, based on one or more factors. The one or more factors may include a number of prior visits by the client device 300, time elapsed since a prior visit, status of the user (e.g., user 102, FIG. 1) of the client device 300, current time and/or date, and other characteristics of the client device 300 (e.g., the one or more client device identifiers). Determining versions of the webpage is further discussed below.

The server system 200 may create different versions of the webpage by modifying (e.g., adding to) the source code of the webpage. For example, a first version of the webpage may include additional source code not found in a second version of the webpage. The additional source code may, for example, include source code associated with an advertising platform (e.g., advertising platform 408, FIG. 8). In some embodiments, the additional source code may be a tracking pixel, as explained above with reference to FIG. 4.

In some embodiments, the server system 200 may embed (508) first code corresponding to a first pixel in a version of a webpage. In some embodiments, the first code is associated with an advertising platform (e.g., advertising platform 408). In some embodiments, the first pixel is a tracking pixel such as an HTML image request from the advertising platform or an HTML frame element (e.g., an iframe), which may pass identification information for the client device 300 to the advertising platform. The identification information may include, for example, IP address, cookie identifier, user identifier (e.g., an identifier corresponding to a social media account associated with the client device), and/or browser identifier.

In some embodiments, the server system 200 may embed (510) second code corresponding to a second pixel in the version of the webpage. In some embodiments, the second code is associated with the server system 200. In some embodiments, the second pixel is a tracking pixel such as an HTML image request from the server system 200 or an HTML frame element (e.g., an iframe), which may pass identification information for the client device 300 to the server system 200. The identification information may include, for example, IP address, cookie identifier(s), user identifier (e.g., an identifier corresponding to a social media account associated with the client device), and/or browser identifier.

Although the embedding steps (508 and 510) are shown as taking place after receiving the request from the client device 300 for the webpage in FIG. 5, the server system 200 may perform the embedding steps prior to receiving the request from the client device 300.

The server system 200 provides (512) the version of the webpage to the client device 300. For example, the server system 200 may make available the version of the webpage and the client device 300 may load the version of the webpage in its web browser application. In some embodiments, the version of the webpage includes the first and second code.

In response to receiving (514) the version of the webpage from the server system 200, the client device 300 loads the webpage. In the process of loading the webpage, the client device 300 may execute (516) the first code. In some embodiments, executing the first code includes signaling the advertising platform to forgo providing one or more advertisements for the service associated with the server system 200 to the client device 300. In some embodiments, signaling the advertising platform may include calling an API of the advertising platform.

In some embodiments, the one or more advertisements may be part of a first advertising campaign for the service being administered by the advertising platform. Executing (516) the first code may cause an identifier for the first advertising campaign to be sent to the advertising platform, to specify the first advertising campaign. For example, the first advertising campaign may be directed towards prospective users of the service. Consequently, the advertising platform forgoes providing advertisements for the first advertising campaign to the client device 300 because the client device 300, after executing the first code, becomes associated with an existing user of the service (e.g., the user of the client device 300 is a registered member of a social network service).

In some embodiments, executing the first code further includes providing (516), by the client device 300, one or more identifiers associated with the client device to the advertising platform. In some embodiments, the one or more identifiers may include, for example, IP address, cookie identifier(s), user identifier (e.g., an identifier corresponding to a social media account associated with the client device), and/or browser identifier. Consequently, the client device 300 may identify itself to the advertising platform as a result of executing the first code. As such, the one or more identifiers (e.g., combined with the identifier for the first advertising campaign) signal the advertising platform to forgo providing advertisements to the identified client device.

In some embodiments, the client device 300 (or a web browser of the client device) may receive a cookie from the advertising platform in response to executing the first code. In some embodiments, the cookie may include an identifier. For example, the identifier may be a client device identification number. In this way, the advertising platform may be able to identify the client device 300 based on the identifier embedded in the cookie.

In response to receiving the version of the webpage from the server system, the client device 300 executes (520) the second code. In some embodiments, executing the second code includes signaling the server system 200. In some embodiments, signaling the server system 200 may include calling an API of the server system 200. Signaling the server system 200 notifies the server system 200 that the second code was executed, which suggests that the first code was also executed. Execution of the second code suggests that the first code was also executed due to the proximity of the first and second code in the source code of the first version of the webpage (e.g., the first and second code may be placed sequentially in the source code of the first version of the webpage). The server system 200 thus may presume that the advertising platform was notified to forgo providing advertisements to the client device 300.

In some embodiments, executing the second code further includes providing, by the client device 300, one or more identifiers associated with the client device 300 to the server system 200. In some embodiments, the one or more identifiers may include, for example, IP address, cookie identifier(s), user identifier (e.g., an identifier corresponding to a social media account associated with the client device), and/or browser identifier. In some embodiments, the one or more identifiers are obtained by the server system 200 from the client device 300 (e.g., from the web browser application of the client device). For example, the second code (e.g., a second tracking pixel) may provide the one or more identifiers to the server system, either directly or indirectly, by calling the API of the server system 200. Consequently, the client device 300 may identify itself to the server system 200 as a result of executing the second code.

The server system 200 may add the client device 300 to one or more lists (e.g., a list of client devices that are ineligible to receive advertisements for the service from the advertising platform). The list may be based on, at least in part, the one or more identifiers provided to the server system 200 by the client device 300. In some embodiments, the server system 200 may add the client device 300 to a list in response to receiving the request for the webpage associated with the service provided by the server system 200. In some embodiments, the server system 200 may add the client device 300 to a list in response to receiving the signal from the client device 300 resulting from execution of the second code. In some embodiments, the server system 200, in adding the client device 300 to either list, may flag the client device 300 as being associated with an existing user. The server system 200 may flag the client device 300 because the server system 200 may want to limit an amount of advertisements being provided to existing users of the advertising platform. Accordingly, the server system 200 may provide either list to the advertising platform. In this way, the advertising platform (e.g., advertising platform 408, FIG. 4) may be notified to limit (or stop) advertisements being sent to the client device 300. The server system 200 may provide the one or more lists to the advertising platform through HTTP, email, custom transfer protocols, and the like.

In some embodiments, the server system 200 provides the version of the webpage to a plurality of client devices. For example, a plurality of client devices 300 (client devices 104-1, 104-2, . . . 104-n, FIG. 1) may make respective requests for the webpage. In response, the server system 200 may provide the version of the webpage to the plurality of client devices, thereby triggering individual executions of the first code and the second code by the plurality of client devices. In such circumstances, the plurality of client devices may (1) signal the advertising platform to forgo providing advertisements for the service associated with the server system to the plurality of client devices, and (2) signal the server system 200. The method 500 thus may be repeated for a plurality of client devices 104.

In some embodiments, in response to the first and second code being executed by the plurality of client devices, the server system 200 adds each of the plurality of client devices to one or more lists. Furthermore, in some embodiments, the server system may provide the one or more lists associated with the plurality of client devices to the advertising platform. The server system may provide the one or more lists to the advertising platform through HTTP, email, custom transfer protocols, and the like.

As discussed above, the server system 200 may form a list by logging identities of one or more client devices that request the webpage (hereinafter referred to as a first list). Alternatively, or in addition, the advertising platform may form a list by logging identities of one or more client devices that execute the first code (hereinafter referred to as a second list). In this way, the advertising platform may track which client devices to forgo providing one or more advertisements for the service, based at least in part on one or more client device identifiers being sent to the advertisement platform by each respective client device during execution of the first code. The advertising platform may form the second list by extracting, from the signal received from the client device 300, the one or more identifiers embedded in the first code (e.g., IP address, cookie identifier(s), user identifier, and/or browser identifier). In some embodiments, the second list corresponds to a specific advertising campaign (e.g., of a plurality of advertising campaigns for the service) and the advertising platform also extracts an identifier of the advertising campaign from the signal.

Moreover, the server system 200 may form another list (e.g., as an alternative to or in addition to the first list) by logging identities of one or more client devices that execute the second code (hereinafter referred to as a third list). The server system 200 may form the third list by extracting, from the signal received from the client device 300, one or more identifiers embedded in the second code (e.g., IP address, cookie identifier(s), user identifier, and/or browser identifier). In some embodiments, the third list may be generated by the server system 200 for redundancy (e.g., the second list generated by the advertising platform and the third list generated by the server system should include the same client devices). The redundancy may be created by placing the first and second codes next to each other in the source code for the webpage. For example, the first code and second code may be placed sequentially in the source code of the webpage. In this example, the second code may be placed directly after (or before) the first code in the source code of the webpage. In this way, both codes may be executed when the webpage is loaded by the client device 300, and as a result, redundancy may be created.

However, in some circumstances or situations, the web browser application of a client device 300 may fail to execute the first code and second code when loading the version of the webpage (e.g., webpage fails to load). In such circumstances, the client device 300 may not signal the advertising platform to forgo providing one or more advertisements for the service, as a result of the first code not executing. Furthermore, the client device 300 may not signal the server system 200 as a result of the second code not executing. Consequently, the client device 300 may continue to receive advertisements from the advertising platform even though the client device 300 may be associated with an existing user of the service (e.g., the user of client device 300 may be a registered member of a social network service).

In some embodiments, the server system 200 may reference the client devices 300 listed in the first list to solve this problem. For example, in response to not receiving the signal from the client device 300, the server system 200 may cause (522) a signal to be sent to the advertising platform instructing the advertising platform to forgo providing the one or more advertisement for the service to the client device. For example, the server system 200 may cause the one or more client device identifiers not found in the third list to be provided to the advertising platform. In some embodiments, providing the advertising platform with the client device identifiers not found in the third list includes causing reloading of the webpage on respective client device(s) 300 associated with the one or more client device identifiers not found in the third list. Accordingly, steps (516) and (520) are repeated at the respective client device(s) 300. In some embodiments, providing the advertising platform with the client device identifiers not found in the third list includes calling, by the server system 200, the advertising platform and providing the client device identifiers not found in the third list. The server system 200 may call the advertising platform through HTTP, email, custom transfer protocols, and the like. Thus, either the client device 300 or the server system 200 may execute the first code, and thus fire the first pixel, in response to the server system 200 not receiving the signal associated with the second code. In some embodiments, this process is performed periodically for a plurality of affected client devices 300. In some embodiments, this process is performed if the signal associated with the second code for a respective client device 300 is not received within a specified period of time.

In another example, in response to not receiving the signal from the client device 300, the server system 200 may compare content of the first list with the content of the third list. The server system 200 may compare client device identifiers found in the first list with client device identifiers found in the third list. In accordance with a determination that one or more client device identifiers found in the first list are not found in the third list, the server system 200 may provide the advertising platform with the client device identifiers not found in the third list. The server system 200 may provide the identifiers because if the third list lacks the one or more client device identifiers, then it is presumed that the second list may also lack the one or more client device identifiers. The server system 200 may make such a presumption because the first code also likely failed to fire (e.g., as the two codes are placed sequentially in the source code for the first version of the webpage).

In some embodiments, the server system 200 compares the content of the first list with the content of the third list periodically (e.g., monthly, or every 30 days) and reconciles any differences.

In some circumstance, the web browser application of the client device 300 may have only executed the second code when loading the version of the webpage. Such a situation may arise when the first code is embedded near the end of the source code and the second code is embedded near the beginning of the source code for the version of the webpage. In these circumstances, the list generated by the server system 200 may include the client device 300 while the list generated by the advertising platform may not include the client device 300. (Alternatively, the server system 200 does not generate a list.) Consequently, the client device 300 may continue to receive advertisements from the advertising platform even though the client device 300 is associated with an existing user. To solve this problem, in some embodiments the server system 200 provides its list to the advertising platform. In this way, the advertising platform may compare its list versus the list provided by the server system 200. The server system 200 may provide the list to the advertising platform through HTTP, email, custom transfer protocols, and the like. In some embodiments, the lists are provided through a network or a shared cloud storage space. Alternatively or in addition to, the server system 200 may cause a signal to be sent to the advertising platform instructing the advertising platform to forgo providing the one or more advertisement for the service to the client device 300.

In some embodiments, after receiving the request for the webpage from the client device 300, the server system 200 may add the client device 300 to a list of client devices that are ineligible to receive advertisements for the service from the advertising platform (e.g., advertising platform 408, FIG. 4). In some embodiments, after receiving the signal from the client device 300, the server system 200 may add the client device 300 to a list of client devices that are ineligible to receive advertisements for the service from the advertising platform.

In some embodiments, the server system 200 may include one or more versions of the webpage. In this way, the server system 200 may provide multiple versions of the webpage (e.g., over a period of time, say, a month) to the client device 300 that appear to be the same, but one version of the webpage may differ from another version. For example, the server system 200 may provide a first version of the webpage (i.e., with the first and second code) in one instance and may provide a second version of the webpage (e.g., without the first and second code) in other instances. The server system 200 may determine which of the one or more versions of the webpage to provide by analyzing the one or more factors including, for example, a number of prior visits by the client device 300, time elapsed since a prior visit, status of the user (e.g., user 102, FIG. 1) of the client device 300, current time and/or date, and other characteristics of the client device 300 (e.g., the one or more identifiers). By limiting provisioning of the first version, the server system 200 limits execution of the first code and thus prevents the advertising platform 408 from learning how active a particular user is. The operator of the server system 200 thus may maintain information about user activity as proprietary, while still controlling whether the advertising platform provides advertisements to particular users.

In some embodiments, in providing (512) the version of the webpage, the server system 200 provides the first version of the webpage (i.e., with the first and second code). The client device 300 may subsequently send one or more requests for the webpage to the server system 200 in response to detecting one or more respective additional user requests for the webpage. In some embodiments, the server system 200 may provide the second version of the webpage (e.g., without the first and second code) to the client device 300 in response to the one or more additional requests. In some embodiments, the server system 200 may provide respective instances of the second version of the webpage to the client device 300 in response to receiving a plurality of additional request from the client device 300. Consequently, the client device 300 does not signal the server system 200 and/or the advertising platform in response to loading instances of the second version of the webpage, in accordance with some embodiments.

In some embodiments, the client device 300 may receive one or more instances of the second version of the webpage in response to respective requests for the webpage until one or more conditions are satisfied. The one or more conditions may include expiration of a period of time. For example, the client device 300 may receive a first instance of the first version of the webpage during a period of time. Furthermore, the client device 300 may receive one or more instances of the second version of the webpage during the period of time (e.g., subsequently to receiving the first instance of the first version). The client device 300 may continue to receive instances of the second version of the webpage in response to respective requests until expiration of the period of time. In some embodiments, the client device 300 may receive instances of the first version of the webpage a predetermined number of times during the period of time. In some embodiments, the predetermined number of times may be a single instance, and after receiving the first instance of the first version of the webpage, the client device 300 may receive instances of the second version of the webpage until expiration of the period of time.

In some embodiments, satisfying the one or more conditions may include continuing to receive instances of the second version of the webpage, after receiving a first instance of the first version of the application, until a threshold number of instances of the second version are received. After receiving the threshold amount of instances of the second version of the webpage (e.g., fifty instances of the second version of the webpage), the client device may receive a second instance of the first version of the webpage in response to a respective request.

In some embodiments, after satisfying the one or more conditions, a new cycle begins (e.g., the period of time resets or the count of received instances of the second version resets). As such, the client device 300, after receiving the second instance of the first version of the webpage, may receive instances of the second version of the webpage until the one or more condition are satisfied again (e.g., expiration of a second cycle).

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
at a server system having one or more processors and memory storing instructions for execution by the one or more processors:
embedding a first executable code corresponding to a first pixel in a version of a webpage;
embedding a second executable code corresponding to a second pixel in the version of the webpage;
providing the version of the webpage for loading by a client device, in response to a request from the client device for the webpage, wherein:
rendering of the first pixel and the second pixel while loading the version of the webpage by the client device triggers execution of the first executable code and the second executable code by the client device;
execution of the first executable code by the client device signals an advertising platform, distinct from the server system, without communicating with the server system and without receiving any request from the advertising platform, to forgo providing one or more advertisements, for a service associated with the server system, to the client device; and
execution of the second executable code by the client device provides a signal to the server system.

2. The method of claim 1, further comprising:
not receiving the signal; and
in response to not receiving the signal, causing a signal to be sent to the advertising platform instructing the advertising platform to forgo providing the one or more advertisements for the service to the client device.

3. The method of claim 1, further comprising adding the client device to a list of client devices that are ineligible to receive advertisements for the service from the advertising platform.

4. The method of claim 1, wherein execution of the first executable code by the client device provides one or more identifiers associated with the client device to the advertising platform.

5. The method of claim 1, wherein execution of the first executable code by the client device prompts the advertising platform to provide a cookie to the client device, the cookie comprising an identifier.

6. The method of claim 1, wherein the request is a first request of a plurality of requests for the webpage received from the client device over a period of time and the version is a first version of the webpage, the method further comprising, at the server system:
providing a second version of the webpage to the client device in response to additional requests of the plurality of requests received from the client device over the period of time, wherein the second version does not include the first executable code and does not include the second executable code.

7. The method of claim 6, wherein:
the first request is an initial request during the period of time; and
the additional requests are subsequent requests during the period of time.

8. The method of claim 1, further comprising, at the server system:
providing the version of the webpage for loading by a plurality of client devices, in response to respective requests from the plurality of client devices for the webpage, wherein:
loading of the version of the webpage by the plurality of client devices triggers execution of the first executable code and the second executable code by the plurality of client devices;
execution of the first executable code by the plurality of client devices signals the advertising platform to forgo providing one or more advertisements for the service associated with the server system to the plurality of client devices; and
execution of the second executable code by the plurality of client devices provides respective signals to the server system.

9. The method of claim 1, further comprising:
not receiving one of the respective signals from a respective client device of the plurality of client devices; and
in response to not receiving one of the respective signals, causing a signal to be sent to the advertising platform instructing the advertising platform to forgo providing the one or more advertisements for the service to the respective client device of the plurality of client devices.

10. The method of claim 1, wherein:
the service associated with the server system is a social media platform; and
the webpage is a homepage of the social media platform.

11. A method, comprising:
at a client device having one or more processors and memory storing instructions for execution by the one or more processors:
requesting a webpage from a server system in response to detecting a user request for the webpage;
receiving a version of the webpage from the server system, wherein the version of the webpage includes first executable code corresponding to a first pixel embedded in the version of the webpage and second executable code corresponding to a second pixel embedded in the version of the webpage; and in response to receiving the version of the webpage from the server system:

rendering the first pixel, thereby executing the first executable code, which signals an advertising platform, distinct from the server system, without communicating with the server system and without receiving any request from the advertising platform, to forgo providing one or more advertisements, for a service associated with the server system, to the client device; and rendering the second pixel, thereby executing the second executable code, which signals the server system.

12. The method of claim 11, further comprising receiving a cookie from the advertising platform in response to executing the first executable code, the cookie comprising an identifier.

13. The method of claim 11, wherein executing the first executable code further comprises providing one or more identifiers associated with the client device to the advertising platform.

14. The method of claim 11, wherein the version is a first version of the webpage, the method further comprising, at the client device:

sending one or more requests for the webpage to the server system in response to detecting one or more respective additional user requests for the webpage; and in response to the one or more requests, receiving one or more instances of a second version of the webpage from the server system, wherein the second version of the webpage does not include the first executable code and does not include the second executable code.

15. The method of claim 14, wherein:

receiving the first version of the webpage comprises receiving a first instance of the first version of the webpage during a period of time;

receiving the one or more instances of the second version of the webpage is performed during the period of time; and the method further comprises, after expiration of the period of time:

sending a new request for the webpage to the server system in response to detecting a new user request for the webpage, and in response to the new request, receiving a second instance of the first version of webpage.

16. The method of claim 14, wherein:

receiving the first instance of the first version of the webpage is performed in response to an initial user request for the webpage during the period of time; and the one or more additional requests are subsequent to the initial user request during the period of time.

17. The method of claim 11, wherein:

the service associated with the server system is a social media platform; and the webpage is a homepage of the social media platform.

18. A non-transitory computer-readable storage medium, storing one or more programs configured for execution by one or more processors of a server system, the one or more programs including instructions, which when executed by the one or more processors cause the server system to:

embed a first executable code corresponding to a first pixel in a version of a webpage;

embed a second executable code corresponding to a second pixel in the version of the webpage;

provide the version of the webpage for loading by a client device in response to a request from the client device for the webpage, wherein:

rendering of the first pixel and the second pixel while loading the version of the webpage by the client device triggers execution of the first executable code and the second executable code by the client device;

execution of the first executable code by the client device signals an advertising platform, distinct from the server system, without communicating with the server system and without receiving any request from the advertising platform, to forgo providing one or more advertisements, for a service associated with the server system, to the client device; and execution of the second executable code by the client device provides a signal to the server system.

19. The computer-readable storage medium of claim 18, wherein the one or more programs further include instructions, which when executed by the one or more processors cause the server system to cause a signal to be sent to the advertising platform instructing the advertising platform to forgo providing the one or more advertisements for the service to the client device in response to not receiving the signal.

20. The computer-readable storage medium of claim 18, wherein the one or more programs further include instructions, which when executed by the one or more processors cause the server system to add the client device to a list of client devices that are ineligible to receive advertisements for the service from the advertising platform.

* * * * *